United States Patent [19]
Wells

[11] Patent Number: 5,375,371
[45] Date of Patent: Dec. 27, 1994

[54] WATERING SYSTEM

[76] Inventor: Anthony L. Wells, 7 Weyhill Close, Singapore, Singapore, 0513

[21] Appl. No.: 937,291

[22] Filed: Aug. 31, 1992

[51] Int. Cl.⁵ ............................................. A01G 25/00
[52] U.S. Cl. ................................................ 47/81; 47/84
[58] Field of Search ................................. 47/81, 79, 84

[56] References Cited
U.S. PATENT DOCUMENTS

| 2,695,474 | 11/1954 | Barstow | 47/81 |
| 3,738,060 | 6/1973 | Davin | 47/81 |
| 4,117,631 | 10/1978 | Tull | 47/81 |
| 4,287,682 | 9/1981 | Browne | 47/81 |

FOREIGN PATENT DOCUMENTS

| 526466 | 10/1921 | France | 47/81 |
| 335788 | 4/1921 | Germany | 47/81 |
| 3272622 | 12/1991 | Japan | 47/81 |
| 109589 | 8/1966 | Norway | 47/81 |
| 180967 | 3/1968 | United Kingdom | 47/81 |
| 1147851 | 4/1969 | United Kingdom | 47/81 |
| 2161357 | 1/1986 | United Kingdom | 47/81 |

Primary Examiner—Henry E. Raduazo
Attorney, Agent, or Firm—Michael I. Kroll

[57] ABSTRACT

An improved watering system is provided which consists of a water supply, an area of soil, vegetation within the area of soil and a mechanism for conveying water from the water supply by capillary action to the vegetation within the area of soil, so that the vegetation can grow normally within the soil.

4 Claims, 2 Drawing Sheets

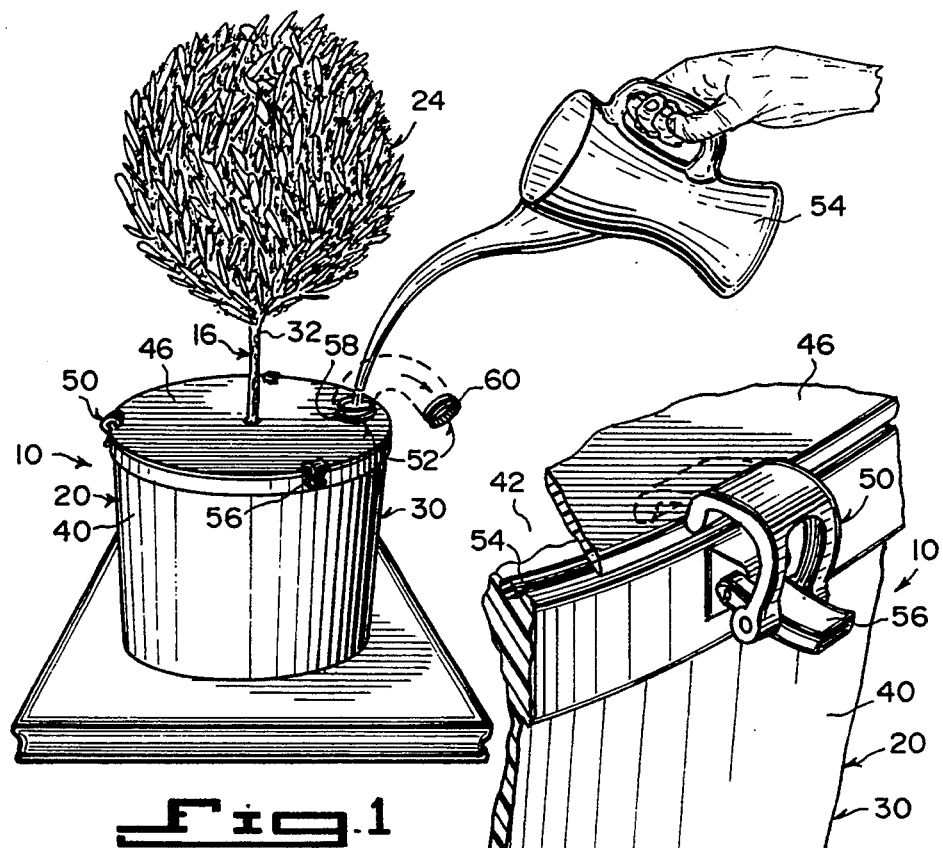
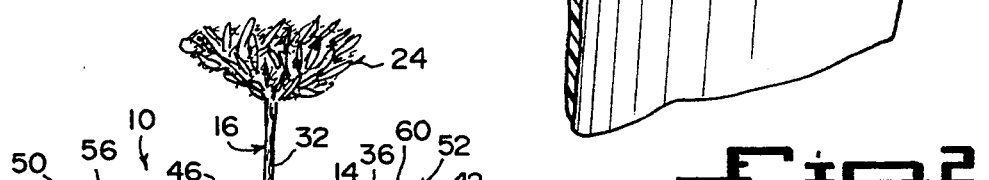
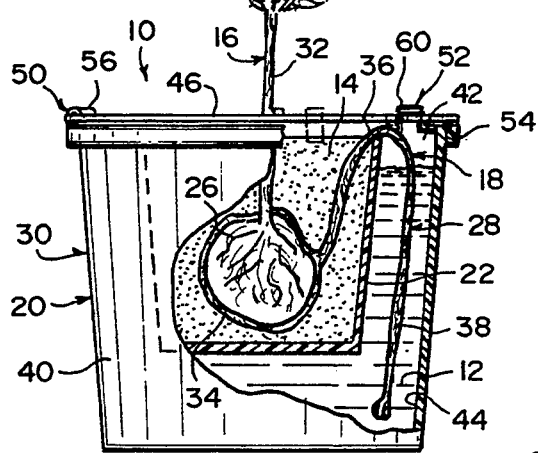
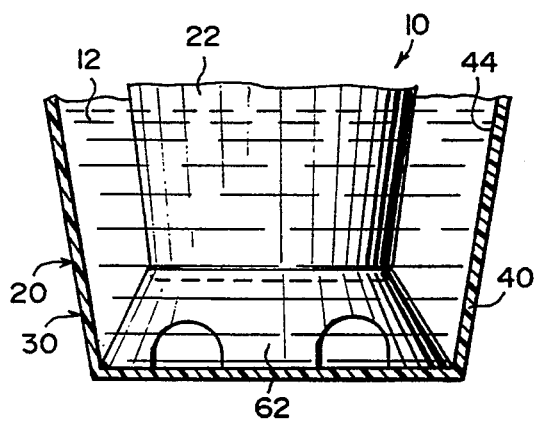

WATERING SYSTEM

BACKGROUND OF THE INVENTION

1. Field of the Invention

The instant invention relates generally to devices for supplying water to plants and more specifically it relates to an improved watering system for vegetation.

2. Description of the Prior Art

Numerous devices have been provided in prior art that are adapted to supply water to plants and the like. While these units may be suitable for the particular purpose to which they address, they would not be as suitable for the purposes of the present invention as heretofore described.

SUMMARY OF THE INVENTION

A primary object of the present invention is to provide an improved watering system that will overcome the shortcomings of the prior art devices.

Another object is to provide an improved watering system that will convey water by capillary action to a potted plant, so that the plant will determine the amount of water it needs.

An additional object is to provide an improved watering system that will convey water by capillary action from water pipes to a filed of vegetation in areas of the earth where the soil lacks water or where there is a serious drought condition.

A further object is to provide an improved watering system that is simple and easy to use.

A still further object is to provide an improved watering system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of a first embodiment of the instant invention.

FIG. 2 is an enlarged perspective view of a portion of the first embodiment showing one of the latch mechanism in greater detail.

FIG. 3 is a front elevational view with parts broken away and in section.

FIG. 4 is a front elevational view with parts broken away and in section of the lower half of the first embodiment showing a support stand therein.

DETAILED DESCRIPTION OF THE PREFERRED EMBODIMENTS

Figure 5:
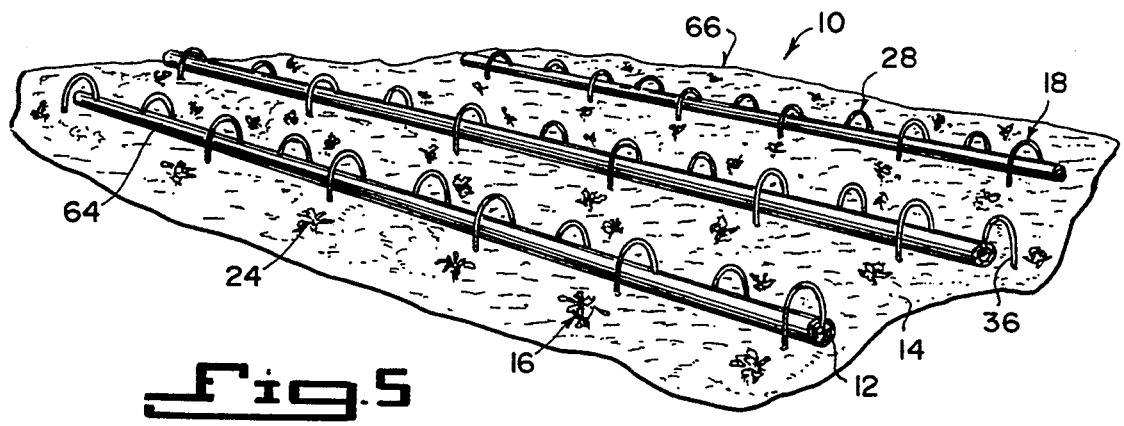
FIG. 5 is a perspective view of a second embodiment of the instant invention.

Turning now descriptively to the drawings, in which similar reference characters denote similar elements throughout the several views, the Figures illustrate an improved watering system 10, which consists of a water supply 12, an area of soil 14, vegetation 16 within the area of soil 14 and a mechanism 18 for conveying water from the water supply 12 by capillary action to the vegetation 16 within the area of soil 14, so that the vegetation 16 can grow normally within the soil 14.

In the improved watering system 10, as shown in FIGS. 1 through 4, the water supply 12 is stored within a reservoir 20. The area of soil 14 is stored within a flowerpot 22. The vegetation 16 is a plant 24 having roots 26 extending into the area of soil 14 within the flowerpot 22.

The water conveying mechanism 18 is a wick assembly 28 extending between the water supply 12 in the reservoir 20 and the roots 26 of the plant 24 in the area of soil 14 in the flowerpot 22. The reservoir 20 is a sealed water refillable receptacle 30. The flowerpot 22 is secured within the receptacle 30, so that a stem 32 of the plant 2 can extend upwardly through a top of the receptacle 30.

The wick assembly 28 includes a porous sack 34 to fit about the roots 26 of the plant 24 in the area of soil 14 within the flowerpot 22. A piece of flexible tubing 36 extends from the porous sack 34 up over the top of the flowerpot 22 and into the water supply 12 in the receptacle 30. A strand 38 of loosely woven, twisted braided fibers, extends through the flexible tubing 36. A first end of the strand 38 can engage with the porous sack 34, while a second end of the strand 38 can engage with the water supply 12 to draw up the water into the roots 26 of the plant 24 when needed.

The receptacle 30 contains a base portion 40 having an open top 42 with a chamber 44 therein for storing the water supply 12 therein and a cover portion 46 having a central aperture 48 therein. An apparatus is for securing the cover portion 46 to the open top 42 of the base portion 40, so that the stem 32 of the plant 24 can extend upwardly through the central aperture 48 in the cover portion 46. A structure 52 is in the cover portion 46, for filling additional water into the water supply 12 n the chamber 44 of the base portion 40, by a watering pot 54 or the like.

The securing apparatus 50 includes an O-ring 54 to fit about a perimeter of the open top 42 of the base portion 40. A plurality of latch mechanisms 56 are spaced about the perimeter of the open top 42 of the base portion 40 to hold the cover portion 46 to the open top 42 of the base portion 40 with the O-ring 54 therebetween, sealing the cover portion 46 thereto.

The water filling structure 52 consists of an externally threaded neck 58 on the cover portion 46, to receive water therethrough and enter the water supply 12 in the chamber 44 of the base portion 40. An internally threaded cap 60 threads onto the externally threaded neck 58.

As shown in FIG. 4, a support stand 62 can be placed within the chamber 44 of the base portion 40 to rest upon the bottom thereof, so that the flowerpot 22 can sit upon the support stand 62.

Figure 6:
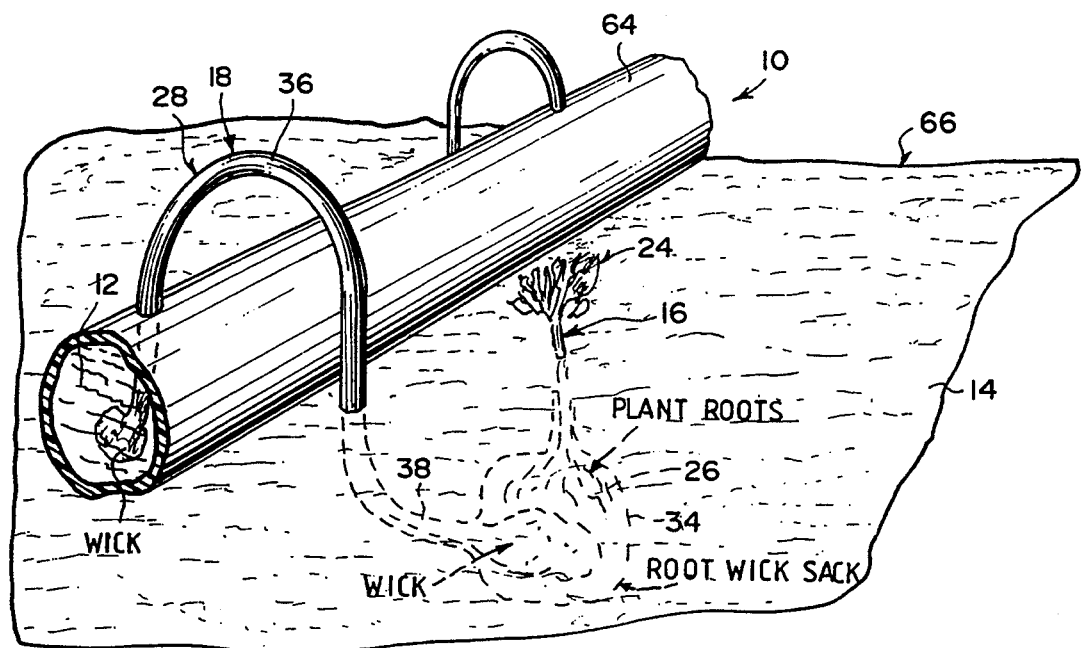
FIG. 6 is an enlarged perspective view of a portion of the second embodiment.
Figure 7:
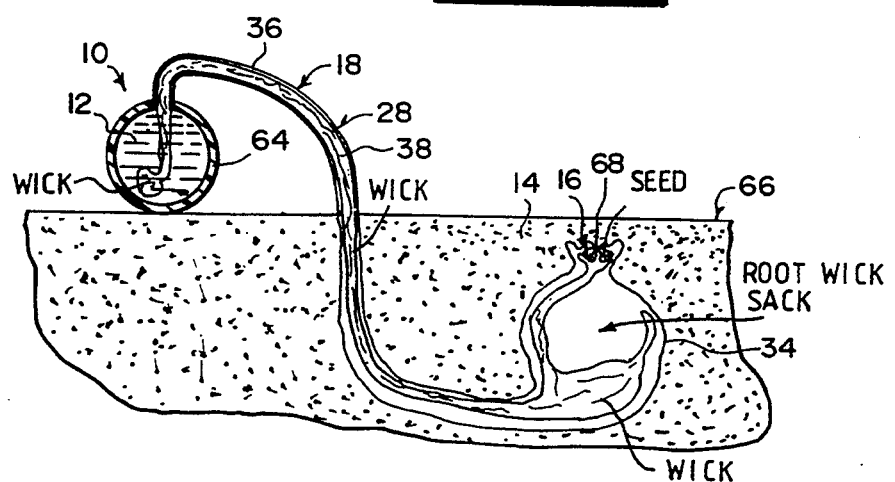
FIG. 7 is a diagrammatic cross sectional view of the second embodiment used for watering a plant seed.

In the improved watering system 10, as shown in FIGS. 5 to 7, the water supply 12 is stored within a plurality of elongated pipes 64. The area of soil 14 is located on a top layer of the surface of the earth 66.

The water conveying mechanism 18 includes a plurality of wick assemblies 28, extending between the water supply 12 in the pipes 64 and the vegetation 16 in the area of soil 14. The pipes 64 are placed externally upon the area of soil 14 adjacent the vegetation 16. Each wick assembly 28 contains a porous sack 34 to fit about one vegetation 16 in the area of soil 14, while a piece of flexible tubing 36 extends from the porous sack 34 up over the top and into one pipe 64 to the water supply 12. A strand 38 of loosely woven, twisted braided fibers extends through the flexible tubing 36. A first end of the strand 38 can engage with the porous sack 34, while a second end of the strand 38 can engage with the water supply 12 to draw up the water into the vegetation 16 when needed.

The vegetation 16, in FIGS. 5 and 6, includes a plurality of plants 24, each having roots 26 extending into the area of soil 14. A porous sack 34 can fit about the roots 26 of each plant 24 to supply water to the roots 26 from the first end of each strand 38. The vegetation 16, in FIG. 7, includes a plurality of plant seeds 68, each planted within the area of soil 14. A porous sack 34 can fit about each plant seed 68 with the first end of the strand 38 engaging with the plant seed 68 to supply water thereto.

LIST OF REFERENCE NUMBERS 10 improved watering system
12 water supply
14 area of soil
16 vegetation
18 water conveying mechanism
20 reservoir
22 flowerpot
24 plant for 16
26 roots of 24
28 wick assembly
30 receptacle for 20
32 stem of 24
34 porous sack
36 flexible tubing
38 strand of loosely woven, twisted braided fibers
40 base portion of 30
42 open top of 40
44 chamber in 40
46 cover portion of 30
48 central aperture in 46
50 securing apparatus
52 water filling structure
54 O-ring
56 latch mechanism
58 externally threaded neck on 46
60 internally threaded cap
62 support stand
64 elongated pipe
66 top layer of the surface of the earth for 14
68 plant seed for 16

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved watering system which comprises:
   a) a water supply;
   b) an area of soil, said area of soil being stored within a reservoir, said area of soil being stored within a flowerpot;
   c) vegetation within said area of soil, said vegetation being a plant having roots extending into said area of soil within said flowerpot; and
   d) means for conveying water from said water supply by capillary action to said vegetation within said area of soil, so that said vegetation can grow normally within said soil, said water conveying means being a wick assembly extending between said water supply in said reservoir and the roots of said plant in said area of soil in said flowerpot, said reservoir being a sealed water refillable receptacle, said flowerpot being secured within said receptacle, so that a stem of said plant can extend upwardly through a top of said receptacle said wick assembly including a porous sack to fit about the roots of said plant in said area of soil within said flowerpot, a piece of flexible tubing extending from said porous sack up over the top of said flowerpot and into said water supply in said receptacle, and a strand of loosely woven, twisted braided fibers extending through said flexible tubing, so that a first end of said strand can engage with said porous sack, while a second end of said strand can engage with said water supply to draw up the water into the roots of said plant when needed, said receptacle including a base portion having an open top with a chamber therein for storing said water supply therein, a cover portion having a central aperture therein, means for securing said cover portion to the open top of said base portion, so that the stem of said plant can extend upwardly through the central aperture in said cover portion, and means in said cover portion for filling additional water into said water supply in the chamber of said base portion.

2. An improved watering system as recited in claim 1, wherein said securing means includes:
   a) an O-ring to fit about a perimeter of the open top of said base portion;
   b) a plurality of latch mechanisms, spaced about the perimeter of the open top of said base portion to hold said cover portion to the open top of said base portion with said O-ring therebetween sealing said cover portion thereto.

3. An improved watering system as recited in claim 2, wherein said water filling means includes:
   a) an externally threaded neck on said cover portion to receive water therethrough and enter said water supply in the chamber of said base portion; and
   b) an internally threaded cap to thread onto said externally threaded neck.

4. An improved watering system as recited in claim 3, further including a support stand placed within the chamber of said base portion to rest upon the bottom thereof, so that said flowerpot can sit upon said support stand.

* * * * *